United States Patent
Datla et al.

(10) Patent No.: US 9,654,412 B2
(45) Date of Patent: *May 16, 2017

(54) METHOD AND SYSTEM FOR DIRECTING USER BETWEEN CAPTIVE AND OPEN DOMAINS

(71) Applicant: Comcast Cable Holdings, LLC, Philadelphia, PA (US)

(72) Inventors: Raju Datla, Cherry Hill, NJ (US); Srini Avirneni, Chester Springs, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,025

(22) Filed: Oct. 10, 2013

(65) Prior Publication Data

US 2014/0143420 A1    May 22, 2014

Related U.S. Application Data

(63) Continuation of application No. 13/336,672, filed on Dec. 23, 2011, now Pat. No. 8,601,545, which is a continuation of application No. 11/933,669, filed on Nov. 1, 2007, now Pat. No. 8,108,911.

(51) Int. Cl.
| | |
|---|---|
| *H04L 29/06* | (2006.01) |
| *H04L 12/911* | (2013.01) |
| *G06F 7/04* | (2006.01) |
| *G06F 15/16* | (2006.01) |
| *G06F 17/30* | (2006.01) |
| *H04L 12/28* | (2006.01) |
| *H04L 29/08* | (2006.01) |

(52) U.S. Cl.
CPC .............. *H04L 47/70* (2013.01); *H04L 63/10* (2013.01); *H04L 67/289* (2013.01); *H04L 67/2814* (2013.01)

(58) Field of Classification Search
None
See application file for complete search history.

(56) References Cited

U.S. PATENT DOCUMENTS

| | | | |
|---|---|---|---|
| 5,440,632 | A | 8/1995 | Bacon et al. |
| 5,666,293 | A | 9/1997 | Metz et al. |
| 5,845,077 | A | 12/1998 | Fawcett |
| 6,023,464 | A | 2/2000 | Woundy |

(Continued)

FOREIGN PATENT DOCUMENTS

WO    2005079000 A1    8/2005

OTHER PUBLICATIONS

ISR issued in PCT/US08/081422, mail date Dec. 23, 2008.
(Continued)

*Primary Examiner* — Shin-Hon Chen
(74) *Attorney, Agent, or Firm* — Banner & Witcoff, Ltd.

(57) ABSTRACT

A method for limiting user access to a captive domain or an open domain. The captive domain may include electronically accessible content that is selected/controlled by a service provider and the open domain may include electronically accessible content that is not completely selected/controlled by the service provider. The method may include configuring a modem or other user device in such a manner as to limit use access to the desired domain.

20 Claims, 2 Drawing Sheets

(56) References Cited

U.S. PATENT DOCUMENTS

| | | | |
|---|---|---|---|
| 6,308,289 B1 | 10/2001 | Ahrens et al. | |
| 6,351,773 B1 | 2/2002 | Fijolek et al. | |
| 6,393,585 B1 | 5/2002 | Houha et al. | |
| 6,501,750 B1 | 12/2002 | Shaffer et al. | |
| 6,529,910 B1* | 3/2003 | Fleskes | 707/770 |
| 6,553,568 B1 | 4/2003 | Fijolek et al. | |
| 6,560,203 B1 | 5/2003 | Beser et al. | |
| 6,570,855 B1 | 5/2003 | Kung et al. | |
| 6,574,796 B1 | 6/2003 | Roeck et al. | |
| 6,577,642 B1 | 6/2003 | Fijolek et al. | |
| 6,636,485 B1 | 10/2003 | Fijolek et al. | |
| 6,654,387 B1 | 11/2003 | Beser et al. | |
| 6,658,000 B1 | 12/2003 | Raciborski et al. | |
| 6,690,655 B1 | 2/2004 | Miner et al. | |
| 6,693,878 B1 | 2/2004 | Daruwalla et al. | |
| 6,715,075 B1 | 3/2004 | Loukianov | |
| 6,751,299 B1 | 6/2004 | Brown et al. | |
| 6,768,722 B1 | 7/2004 | Katseff et al. | |
| 6,768,743 B1 | 7/2004 | Borella et al. | |
| 6,822,955 B1 | 11/2004 | Brothers et al. | |
| 6,831,921 B2 | 12/2004 | Higgins | |
| 6,836,806 B1 | 12/2004 | Raciborski et al. | |
| 6,857,009 B1 | 2/2005 | Ferreria et al. | |
| 6,865,613 B1 | 3/2005 | Millet et al. | |
| 6,904,460 B1 | 6/2005 | Raciborski et al. | |
| 6,917,675 B2 | 7/2005 | Lazarus et al. | |
| 6,952,428 B1 | 10/2005 | Necka et al. | |
| 7,007,080 B2 | 2/2006 | Wilson | |
| 7,035,270 B2 | 4/2006 | Moore, Jr. et al. | |
| 7,039,432 B2 | 5/2006 | Strater et al. | |
| 7,058,055 B2 | 6/2006 | Mugica et al. | |
| 7,065,047 B2 | 6/2006 | Boxall et al. | |
| 7,085,814 B1 | 8/2006 | Gandhi et al. | |
| 7,120,139 B1 | 10/2006 | Kung et al. | |
| 7,127,049 B2 | 10/2006 | Godse et al. | |
| 7,158,543 B1 | 1/2007 | Garakani et al. | |
| 7,213,062 B1 | 5/2007 | Raciborski et al. | |
| 7,272,846 B2 | 9/2007 | Williams et al. | |
| 7,285,090 B2 | 10/2007 | Stivoric et al. | |
| 7,293,078 B2 | 11/2007 | Danforth | |
| 7,293,282 B2 | 11/2007 | Danforth et al. | |
| 7,308,700 B1 | 12/2007 | Fung et al. | |
| 7,334,258 B1 | 2/2008 | Ford et al. | |
| 7,337,217 B2 | 2/2008 | Wang | |
| 7,353,021 B2 | 4/2008 | Ejzak et al. | |
| 7,356,841 B2 | 4/2008 | Wilson et al. | |
| 7,372,809 B2 | 5/2008 | Chen et al. | |
| 7,373,660 B1 | 5/2008 | Guichard et al. | |
| 7,415,603 B2 | 8/2008 | Woundy et al. | |
| 7,443,883 B2 | 10/2008 | Seiden | |
| 7,467,214 B2 | 12/2008 | Chin | |
| 7,484,234 B1 | 1/2009 | Heaton et al. | |
| 7,496,485 B2 | 2/2009 | Elfadel et al. | |
| 7,496,652 B2 | 2/2009 | Pezzutti | |
| 7,502,841 B2 | 3/2009 | Small et al. | |
| 7,512,969 B2 | 3/2009 | Gould et al. | |
| 7,526,538 B2 | 4/2009 | Wilson | |
| 7,539,193 B2 | 5/2009 | Pfeffer et al. | |
| 7,568,220 B2 | 7/2009 | Burshan | |
| 7,600,003 B1 | 10/2009 | Okmianski et al. | |
| 7,609,619 B2 | 10/2009 | Naseh et al. | |
| 7,617,517 B2 | 11/2009 | Kay | |
| 7,647,617 B2 | 1/2010 | Bartfeld et al. | |
| 7,693,171 B2 | 4/2010 | Gould | |
| 7,710,865 B2 | 5/2010 | Naseh et al. | |
| 7,747,772 B2 | 6/2010 | Raciborski et al. | |
| 7,769,886 B2 | 8/2010 | Naseh et al. | |
| 7,836,092 B2* | 11/2010 | Alaniz et al. | 707/802 |
| 7,839,870 B2 | 11/2010 | Siripunkaw et al. | |
| 7,848,234 B2 | 12/2010 | McKinnon, III et al. | |
| 7,881,225 B2 | 2/2011 | Siripunkaw et al. | |
| 8,041,824 B1* | 10/2011 | Maeng | 709/229 |
| 8,042,132 B2 | 10/2011 | Carney et al. | |
| 8,050,194 B2 | 11/2011 | Siripunkaw et al. | |
| 8,108,911 B2 | 1/2012 | Datla et al. | |
| 8,493,987 B2 | 7/2013 | Siripunkaw et al. | |
| 8,914,522 B2 | 12/2014 | Rao et al. | |
| 2001/0038690 A1 | 11/2001 | Palmer et al. | |
| 2001/0049732 A1 | 12/2001 | Raciborski et al. | |
| 2001/0051980 A1 | 12/2001 | Raciborski et al. | |
| 2001/0053159 A1 | 12/2001 | Bunn et al. | |
| 2002/0010865 A1 | 1/2002 | Fulton et al. | |
| 2002/0013948 A1 | 1/2002 | Aguayo et al. | |
| 2002/0042819 A1 | 4/2002 | Reichert et al. | |
| 2002/0061012 A1 | 5/2002 | Thi et al. | |
| 2002/0066033 A1* | 5/2002 | Dobbins et al. | 713/201 |
| 2002/0103931 A1 | 8/2002 | Mott | |
| 2002/0106017 A1 | 8/2002 | Dombkowski et al. | |
| 2002/0116721 A1 | 8/2002 | Dobes et al. | |
| 2002/0147819 A1 | 10/2002 | Miyakoshi et al. | |
| 2002/0152384 A1 | 10/2002 | Shelest et al. | |
| 2003/0014764 A1 | 1/2003 | Saladino et al. | |
| 2003/0069965 A1 | 4/2003 | Ma et al. | |
| 2003/0106067 A1 | 6/2003 | Hoskins et al. | |
| 2003/0200548 A1 | 10/2003 | Baran et al. | |
| 2004/0024912 A1 | 2/2004 | Fukao et al. | |
| 2004/0037316 A1 | 2/2004 | Choi et al. | |
| 2004/0048609 A1 | 3/2004 | Kosaka | |
| 2004/0095923 A1 | 5/2004 | Ejzak et al. | |
| 2004/0103308 A1 | 5/2004 | Paller | |
| 2004/0153665 A1* | 8/2004 | Browne | 713/201 |
| 2004/0177133 A1 | 9/2004 | Harrison et al. | |
| 2004/0179539 A1 | 9/2004 | Takeda et al. | |
| 2004/0190699 A1* | 9/2004 | Doherty et al. | 379/201.12 |
| 2004/0213278 A1 | 10/2004 | Pullen et al. | |
| 2004/0226051 A1 | 11/2004 | Carney et al. | |
| 2005/0005154 A1 | 1/2005 | Danforth et al. | |
| 2005/0034115 A1 | 2/2005 | Carter et al. | |
| 2005/0047442 A1 | 3/2005 | Volpe et al. | |
| 2005/0055595 A1 | 3/2005 | Frazer et al. | |
| 2005/0055708 A1 | 3/2005 | Gould et al. | |
| 2005/0060749 A1 | 3/2005 | Hong et al. | |
| 2005/0078668 A1* | 4/2005 | Wittenberg et al. | 370/389 |
| 2005/0078688 A1 | 4/2005 | Sharma et al. | |
| 2005/0122976 A1 | 6/2005 | Poli et al. | |
| 2005/0123001 A1 | 6/2005 | Craven et al. | |
| 2005/0204168 A1* | 9/2005 | Johnston et al. | 713/201 |
| 2005/0232304 A1 | 10/2005 | Quigley | |
| 2005/0233742 A1 | 10/2005 | Karaoguz et al. | |
| 2005/0246757 A1 | 11/2005 | Relan et al. | |
| 2006/0031436 A1 | 2/2006 | Sakata et al. | |
| 2006/0031921 A1 | 2/2006 | Danforth et al. | |
| 2006/0059092 A1* | 3/2006 | Burshan et al. | 705/51 |
| 2006/0104232 A1 | 5/2006 | Gidwani | |
| 2006/0123118 A1* | 6/2006 | Choe et al. | 709/227 |
| 2006/0159100 A1 | 7/2006 | Droms et al. | |
| 2006/0173977 A1 | 8/2006 | Ho et al. | |
| 2006/0184640 A1 | 8/2006 | Hatch | |
| 2006/0191005 A1 | 8/2006 | Muhamed et al. | |
| 2006/0206586 A1 | 9/2006 | Ling et al. | |
| 2006/0223497 A1 | 10/2006 | Gallagher et al. | |
| 2006/0256799 A1 | 11/2006 | Eng | |
| 2006/0271772 A1 | 11/2006 | Woundy et al. | |
| 2006/0271946 A1 | 11/2006 | Woundy et al. | |
| 2006/0285544 A1 | 12/2006 | Taylor et al. | |
| 2007/0011725 A1* | 1/2007 | Sahay et al. | 726/4 |
| 2007/0016762 A1 | 1/2007 | Ho | |
| 2007/0130471 A1 | 6/2007 | Walker Pina et al. | |
| 2007/0133409 A1 | 6/2007 | McKinnon et al. | |
| 2007/0174471 A1 | 7/2007 | Van Rossum | |
| 2007/0177526 A1 | 8/2007 | Siripunkaw et al. | |
| 2007/0180484 A1 | 8/2007 | Siripunkaw et al. | |
| 2007/0183405 A1 | 8/2007 | Bennett | |
| 2007/0214265 A1* | 9/2007 | Zampiello et al. | 709/226 |
| 2008/0034071 A1 | 2/2008 | Wilkinson et al. | |
| 2008/0060064 A1* | 3/2008 | Wynn et al. | 726/5 |
| 2008/0189778 A1 | 8/2008 | Rowley | 726/9 |
| 2008/0209537 A1* | 8/2008 | Wong et al. | 726/12 |
| 2008/0285544 A1 | 11/2008 | Qiu et al. | |
| 2009/0005066 A1 | 1/2009 | Florkey et al. | |
| 2009/0063833 A1 | 3/2009 | Ho | |
| 2009/0125958 A1 | 5/2009 | Siripunkaw et al. | |
| 2009/0238349 A1 | 9/2009 | Pezzutti | |
| 2010/0064356 A1 | 3/2010 | Johnston et al. | |

(56) References Cited

U.S. PATENT DOCUMENTS

2010/0083362 A1   4/2010   Francisco
2011/0026536 A1   2/2011   Siripunkaw et al.
2013/0091534 A1*  4/2013   Gilde et al. .................. 726/1

OTHER PUBLICATIONS

EP Search Report 08 84 6111, dated Feb. 7, 2011.
ISR issued in PCT/US06/45184, mail date Oct. 29, 2007.
International Preliminary Report on Patentability issued in PCT/US06/45184, mail date May 27, 2008.
European Office Action dated Aug. 1, 2013 in European Patent Application No. 08846111.6.
Non-Final Office Action for U.S. Appl. No. 11/603,761 dated Apr. 16, 2007.
Non-Final Office Action for U.S. Appl. No. 11/603,761 dated Nov. 12, 2009.
Final Office Action for U.S. Appl. No. 11/603,761 dated Jun. 7, 2010.
Canadian Office Action—CA 2,568,741—Mailing Date: Feb. 18, 2015.
Canadian Office Action—Canadian Application 2568740—Dated Jan. 26, 2015.
Canadian Office Action, dated Mar. 26, 2015—CA 2,700,625.
Response to Canadian Office Action—CA Appl. 2,568,741—submitted Aug. 18, 2015.
Canadian Office Action—CA Appl. 2,568,743—dated Apr. 2, 2015.
Response to Canadian Office Action—CA 2,700,625—Dated Sep. 14, 2015.
Response to Canadian Office Action—CA 2,568,743—Dated Oct. 1, 2015.
Canadian Office Action—CA 2,568,741—Mailed May 10, 2016.
Response to Canadian Office Action—CA 2,568,740—Dated Jul. 13, 2015.

* cited by examiner

METHOD AND SYSTEM FOR DIRECTING USER BETWEEN CAPTIVE AND OPEN DOMAINS

CROSS-REFERENCE TO RELATED APPLICATIONS

This application is a continuation of U.S. application Ser. No. 13/336,672, filed Dec. 23, 2011, which is a continuation of U.S. Pat. No. 8,108,911, filed Nov. 1, 2007, the entire contents of which are incorporated herein by reference.

BACKGROUND OF THE INVENTION

1. Field of the Invention

The present invention relates to directing a user between captive and open domains.

2. Background Art

In a service provider network such as, but not limited to, those associated with television or high speed data service providers, particularly service providers that have a large customer base, one challenge faced by the service provider is to redirect customers to customized portals. These portals can be used for any number of reasons, including allowing customers to select service-specific configurations, displaying a warning message for reminding customers to take appropriate action, and/or forcing certain customers to the portal until the forced customer takes an appropriate action.

Existing approaches and/or solutions require intercepting all the network traffic and redirecting the traffic to service-specific portals in real time. This approach can be undesirable since the intercepted traffic can impact traffic for all customers. Another approach relies on reconfiguring a modem (Cable or DSL or FTTH) to direct the customer to the desired portal. This approach may not be preferred since the reconfiguring the modem requires the modem to be rebooting the modem before the customer is allowed to leave the specific portal.

BRIEF DESCRIPTION OF THE DRAWINGS

The present invention is recited with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
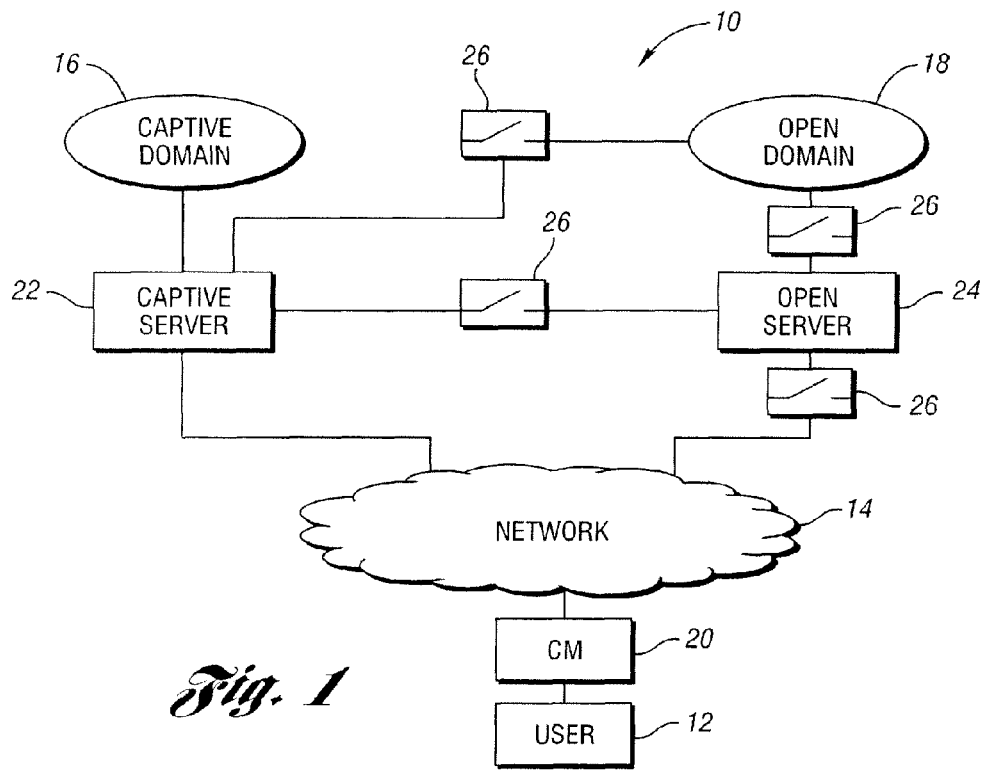
FIGS. 1-3 illustrate a system having captive and open domains in accordance with one non-limiting aspect of the present invention.

FIG. 1 illustrates a domain name system (DNS) 10 in accordance with one non-limiting aspect of the present invention. The system 10 may be associated with a television, high speed data, or other service provider (not shown) having capabilities to provide any number of services to a user 12 through signals carried over a service provider network 14. For exemplary purposes, the system is predominately described with respect to the service provider supporting high speed data-related operations. The present invention, however, is not intended to be so limited and fully contemplates its application to any number of environments besides those associated with high speed data.

The system 10 may include at least one captive domain 16 and one open domain 18. The domains 16, 18 may include servers, databases, and other sources of electronic content. These sources may be characterized as being associated with different domains 16, 18 for exemplary purpose and to emphasize different access and content restrictions associated therewith. The content of each domain, however, may be shared between the domains 16, 18, i.e., the same server may support content that is accessible through both of the domains 16, 18. The term 'domain' may be characterized as a reference address, or forced address, used to access the content therein, as described below in more detail. The term 'domain' is selected to correspond with grouping characteristics associated with the exemplary DNS protocols and architectures that may be used to control and direct access to the domains 16, 18.

The open domain 18 may be associated with the World Wide Web or other similar domain where any internet or other network user may be free to access any type of content, including content provided by entities other than the service provider or entities not under the control/approval of the service provider. The captive domain 16 may be a private domain associated with the service provider or otherwise having controlled or forced access where the same user is forced to access content specified by the service provider or otherwise authorized/controlled by the service provider (i.e., walled garden). The captive domain 16 may optionally be accessible only to devices (users) authorized by the service provider and/or devices connected to the service provider network 14.

A piece of customer premise equipment (CPE), for example a cable modem (CM) 20, may be included to facilitate user access to the service provider network 14. The cable modem 20 may be configured to receive instructions and other commands from the service provider, including instructions associated with its provisioning. This may allow the service provider to configure DNS and other attributes of the cable modem 20 associated with allowing the user to access one of 20 the domains 16, 18 through communications carried over the network 14. The attributes programmed to the cable modem 20 may be inherited by a computer or other device (not shown) connected to the cable modem 20 which the user controls to access the domains 16, 18. An ability of the service provider to individually and/or collectively provision its cable modems 20, or other equivalent device, to force user access to one of the domains 16, 18 allows the service provider to selectively control content accessible to its subscribers.

The cable modem 20 may be configured to facilitate communications with the service provider network 14 for relay to a captive server 22 and/or an open server 24 associated with the captive domain 16 and open domain 18, respectively. The servers 22, 24 may be DNS-type servers configured to facilitate access to the associated domains 16, 18. The servers 22, 24 may be configured to support any number of operations, including addressing operations associated with directing the user, or the cable modem 20 associated with the user, to specific portals/webpages associated with each domain 16, 18. The content associated with portals, web pages, etc. accessible through each domain 16, 18 may be hosted by elements associated with the domains 16, 18 and found through addresses and other instructions provided through the servers 22, 24.

FIG. 1 illustrates one configuration of the present invention where the cable modem 20 is instructed to facilitate communications with the captive server 22. The captive server 22 is further instructed to direct communications to the captive domain 16 and, optionally, to specific portals, webpages, etc. included within the captive domain 16. This arrangement may be beneficial if a need exists to force the user to access content specified by the service provider and included with the captive domain 16. For example, when the cable modem 20 is initially deployed and connected to the network 14, the service provider may restrict the cable modem 20 to access content available to through the captive domain 16, such as to provide a walled garden.

The cable modem 20, if initially restricted to accessing the walled garden, may begin an activation process where it is configured or otherwise 20 instructed to perform or support various services purchased or otherwise available to the user. During this period, the cable modem 20 and/or captive server 22 may be instructed to allow the user to access specific portals within the captive domain 16. This can be helpful in forcing the user to select desired operating parameters and to allow the service provider to make sale offers, indicate promotions, and provide other information that may be of interest to the user at a particular period of time.

Figure 2:
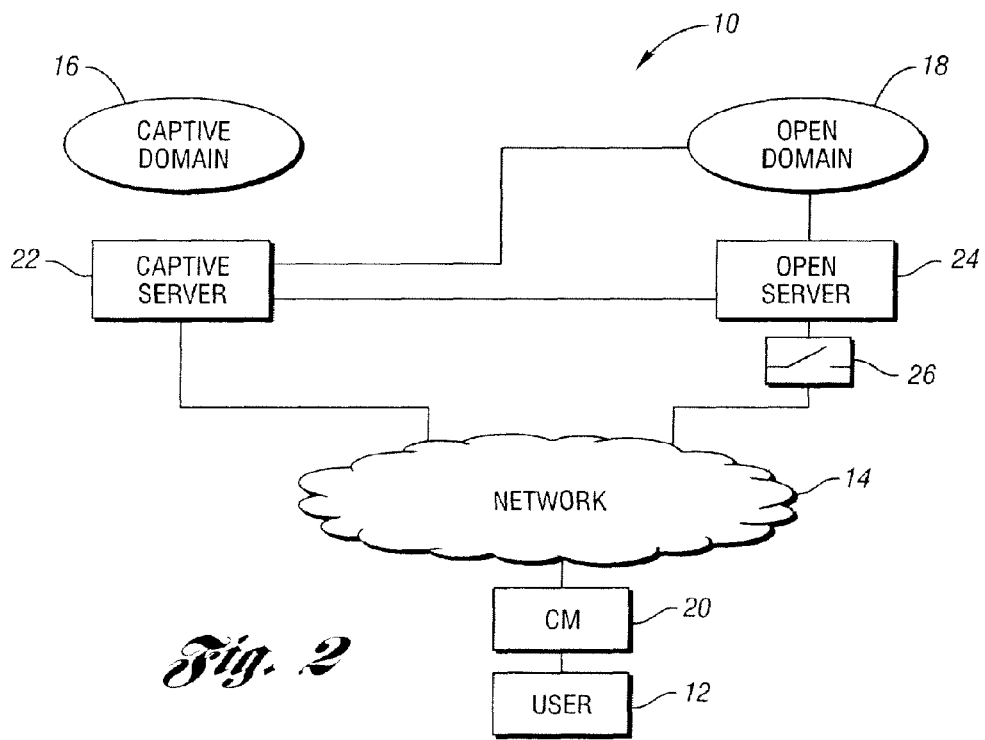

FIG. 2 illustrates the system 10 upon completion of the activation process or other event which limits access by the user the captive domain 16. The user is now able to access the open domain 18 and the content associated therewith. The access associated with FIG. 2 may require communications between the user and the open domain 18 to be routed or otherwise directed by the captive domain server 22, either through communications with the open server 24 (which may be necessary if the captive domain server 22 is unable to communicate with the open domain 18) and/or direct communications with the open domain 18. The use of the captive server 22 to facilitate access to the open domain 18 may be advantageous in allowing the user to access the open domain 18, after being restricted to the captive domain 16, without having to reboot or wait for reboot of the cable modem 20.

As one skilled in the art will appreciate, to change from one server to another, i.e., from the captive server 22 to the open server 24, the cable modem 20 may require a new configuration file, new parameter setting, or other instruction, which can only become effective once the cable modem 20 is rebooted. The present invention, at least with respect to one non-limiting aspect, contemplates its application to cable modems 20 which require reboot before new DNS attributes can be used to direct operations of the cable modem 20 and/or before they can be inherited by the device connected thereto.

The cable modem 20 may be rebooted manually through the user turning the cable modem 20 off and on and/or through the service provider directing the cable modem 20 to turn off and on. This type of reboot can be problematic since it requires the user to experience a short interruption in services and/or to perform 20 a manual operation to the cable modem 20. Cable modems 20 or other types of CPEs may be configured by the service provider to be active on the network 14 for a pre-defined time with a renew interval defined every x number of days. The renew interval may allow for the cable modem 20 or other types of CPE to stay active on the network 14 and receive new and/or additional parameters without any 25 interruptions, or at least until expiration of the renew period when the service provider forces the cable modem 20 to reboot. This can be helpful in checking whether the cable modem 20 is still active and to update the cable modem 20 operations without a manual reboot. This type of reboot can be problematic since it requires completion of the renew period before the user is able to switch from one server to another.

The present invention allows the user to effectively switch from one server 22, 24 to another without the delays and/or interruptions mentioned above since the present invention is able to configure the captive server 22 to support operations necessary for allowing the user to access the open domain 18 prior to reboot of the cable modem 20, i.e., without requiring the cable modem 20 to directly communicate with the open server 24. Since the operations of the cable modem 20 are not, at least initially, changed when transitioning from FIG. 1 to FIG. 2, the present invention is able to allow the user to access the open domain 18 without having to reboot the cable modem 20 and without a disruption in services.

Figure 3:
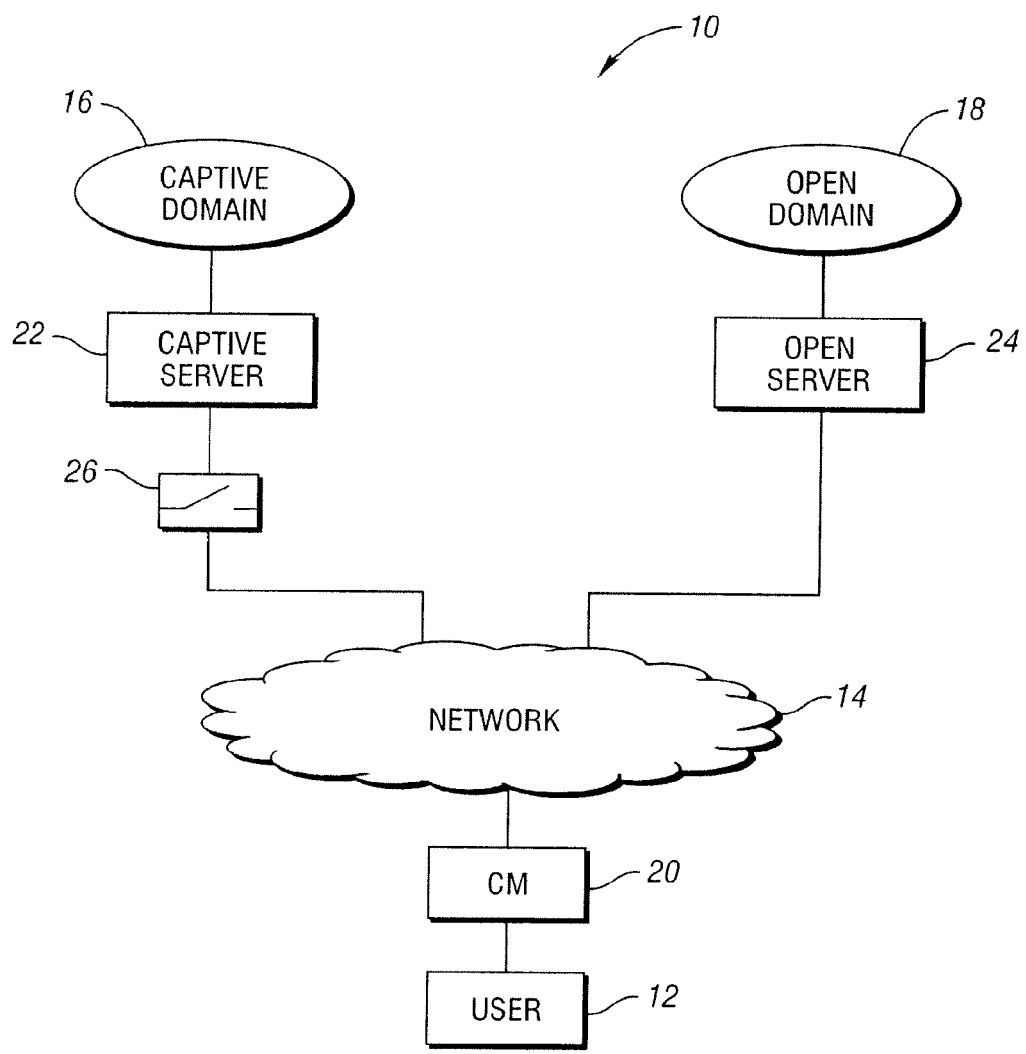

FIG. 3 illustrates the cable modem 20 communicating with the open server 24 instead of the captive server 22. This may occur upon expiration of the renew period and/or in response to a some other reboot, such as in response to the service provider issuing a signal to force an immediate reboot. As noted above and as long as the cable modem 20 receives the changes to its attributes, the reboot forces the cable modem 20 to facilitate communications with the open server 24 instead of the captive server 22 so as to provide access to the open domain 18 and its content. This can be helpful in moving the processing demands from the captive server 22 to the open server 24, freeing the captive server 22 to support captive domain communications with other users.

FIGS. 1-3 describe various aspect of the present invention and restricting user access to content available from one or more of the domains 16, 18. A number of switches 26 are shown to further demonstrate the restrictions. These switches 26 are shown of exemplary purposes and are not intended to reflect the need for actual switches are similar type devices to control access between the element connected thereto, although the present invention does contemplate the use of actual switches if needed in some environments. As such, while there may be physical or wireless connections between the elements connected by the switches 26, the switches 26 are primarily intended to symbolize access between the connected to elements. The switches 26 are shown in an open state to indicate an inability to communicate through the connection associated therewith.

The foregoing arrangement allows the present invention to address various business use cases. One use case may include relegating a customer to a captive portal during the activation process, where the customer is allowed to make service-specific configuration changes. Another use case may include relegating the 5 customer to a captive portal, with a warning page and appropriate corrective or ignore options, when the customer has reached a threshold limit. Some threshold limit examples may include excessive bandwidth usage, excessive downloads/updates, or excessive generation of email/spam. Another use case may include relegating the customer to a captive portal, such as to inform them of missing or delayed payments to the service provider. Still another use case may include relegating the customer to a friendly portal, such as to support enhanced features like birthday greetings, at the request of the customer or in response to a message received from another user in communication with the system. Another use case may include forcing the customer to a captive portal until a corrective action 15 is completed, such as to force the customer to correct an abuse of service, non-payment of bills, etc.

The present invention may be configured such that customers may be provisioned with specific DNS attributes without changing their provisioned service class and with the use of a DNS application controlled via a policy engine to redirect 20 the customers to various portals. The present invention may leverage provisioning flows for modems (Cable or DSL or FTTH modems) and their supported capabilities to redirect the devices behind the modem to a particular DNS domain. This may include the use of various mechanisms to relegate customer traffic, under certain scenarios, to a captive portal. The present invention may operate in a 25 triple-play environment with various devices, such as high speed modems (cable, DSL, or FTTH), VoIP endpoints (MTAs and IADs), video set-top boxes, and wireless handsets (3G and 4G).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   permitting, by a computing device, communications from a user device to a captive domain and blocking communications from the user device to an open domain; and
   subsequent to the permitting, forwarding, by the computing device, new communications from the user device to the open domain after a provisioning attribute configured to force access to the open domain via an open domain device and not via the computing device has been sent to the user device.
2. The method of claim 1, further comprising:
   in response to an activation of the provisioning attribute, forcing other communications from the user device to the open domain via the open domain device.
3. The method of claim 1, wherein the forwarding, by the computing device, the new communications from the user device to the open domain after the provisioning attribute has been sent to the user device is allowed prior to activating the provisioning attribute at the user device.
4. The method of claim 1, wherein the computing device comprises a captive domain server; and wherein the permitting the communications from the user device to the captive domain and the blocking the communications from the user device to the open domain is performed by:
   permitting, by the captive domain server, communications from the user device to access captive content specified by a service provider of the captive domain; and
   blocking, by the captive domain server, communications from the user device to access open content of the open domain independent of the service provider.
5. The method of claim 1, wherein the permitting, by the computing device, the communications from the user device to the captive domain and the blocking communications from the user device to the open domain occurs during an activation process of services sent to the user device; and wherein the forwarding, by the computing device, the new communications from the user device to the open domain occurs after the activation process has been completed.
6. The method of claim 1, wherein the user device is a modem, the method further comprising:
   activating the provisioning attribute if the modem is rebooted.
7. The method of claim 1, further comprising:
   subsequent to a reboot of the user device, forcing, by the computing device, other communications from the user device to the open domain via the open domain device.
8. A method comprising:
   transmitting, from a computing device to a captive domain device, a request to access a captive domain and a first request to access an open domain;
   in response to the transmitting, receiving, by the computing device, captive content associated with the captive domain and not receiving open content associated with the open domain;
   subsequent to the transmitting and the receiving, receiving, by the computing device, a provisioning attribute configured to force access to the open domain via an open domain device and not via the captive domain device; and
   subsequent to the receiving the provisioning attribute, transmitting, from the computing device to the captive domain device, a second request to access the open domain.
9. The method of claim 8, further comprising:
   in response to transmitting the second request to access the open domain, receiving, by the computing device and from the captive domain device, open content associated with the open domain.
10. The method of claim 8, further comprising:
    subsequent to the receiving the provisioning attribute, transmitting, from the computing device to the captive domain device, new requests to access the open domain.
11. The method of claim 8, further comprising:
    subsequent to an activation of the provisioning attribute by the computing device, forcing new requests to access the open domain to be sent to the open domain device rather than the captive domain device.
12. The method of claim 8, wherein the transmitting, from the computing device to the captive domain device, the second request to access the open domain is prior to activating the provisioning attribute by the computing device.
13. The method of claim 8, further comprising:
    activating the provisioning attribute allowing the computing device to access the open domain via the open domain device and not via the captive domain device upon reboot of the computing device.
14. The method of claim 8, further comprising:
    prior to the receiving the provisioning attribute, executing an activation process for services.
15. The method of claim 8, wherein the provisioning attribute is one of a configuration file, a parameter setting, and an instruction.
16. A method comprising:
    permitting, via a captive domain device, a user device to access a captive domain;
    blocking, by the captive domain device, the user device from access to an open domain;
    transmitting, from the captive domain device to the user device, a provisioning attribute configured to force the user device to access the open domain via an open domain device and not via the captive domain device; and after the transmitting, using the captive domain device to forward communications from the user device to the open domain.

17. The method of claim 16, further comprising:

authorizing the user device to access the open domain after an activation process of services at the user device has been completed.

18. The method of claim 16, wherein the provisioning attribute is configured to prevent the user device from accessing the open domain via the captive domain device upon activation of the provisioning attribute by the user device.

19. The method of claim 16, wherein the permitting, via the captive domain device, the user device to access the captive domain is performed by permitting the user device to access captive content of the captive domain specified by a service provider via the captive domain device.

20. The method of claim 16, wherein the user device is a modem and the provisioning attribute is configured to activate once the modem is rebooted to force the user device to access the open domain via the open domain device.

* * * * *

UNITED STATES PATENT AND TRADEMARK OFFICE
CERTIFICATE OF CORRECTION

| | |
|---|---|
| PATENT NO. | : 9,654,412 B2 |
| APPLICATION NO. | : 14/051025 |
| DATED | : May 16, 2017 |
| INVENTOR(S) | : Datla et al. |

It is certified that error appears in the above-identified patent and that said Letters Patent is hereby corrected as shown below:

In the Specification

Detailed Description of the Preferred Embodiment(s), Column 2, Line 39:
After "of", please delete "20".

Detailed Description of the Preferred Embodiment(s), Column 3, Line 12:
After "otherwise", delete "20".

Detailed Description of the Preferred Embodiment(s), Column 3, Line 53:
After "perform", delete "20".

Detailed Description, Column 3, Line 60:
After "any", delete "25".

Detailed Description, Column 4, Line 60:
After "action", delete "15".

Detailed Description, Column 4, Line 66:
After "redirect", delete "20".

Signed and Sealed this
Twenty-fifth Day of October, 2022

*Katherine Kelly Vidal*

Katherine Kelly Vidal
*Director of the United States Patent and Trademark Office*